HEINZ-DIETER PANTKE
HERBERT HICKMANN
INVENTOR.

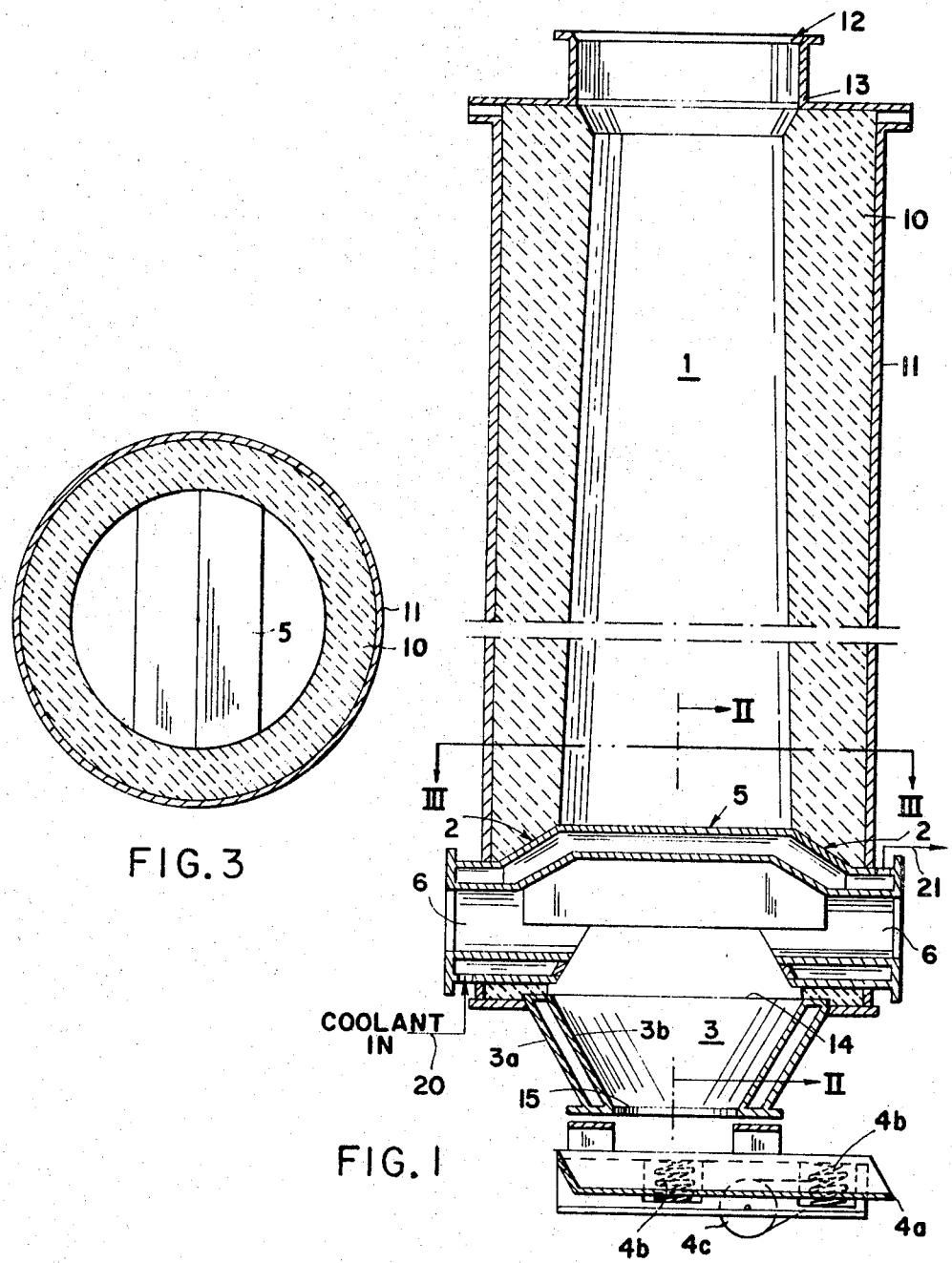

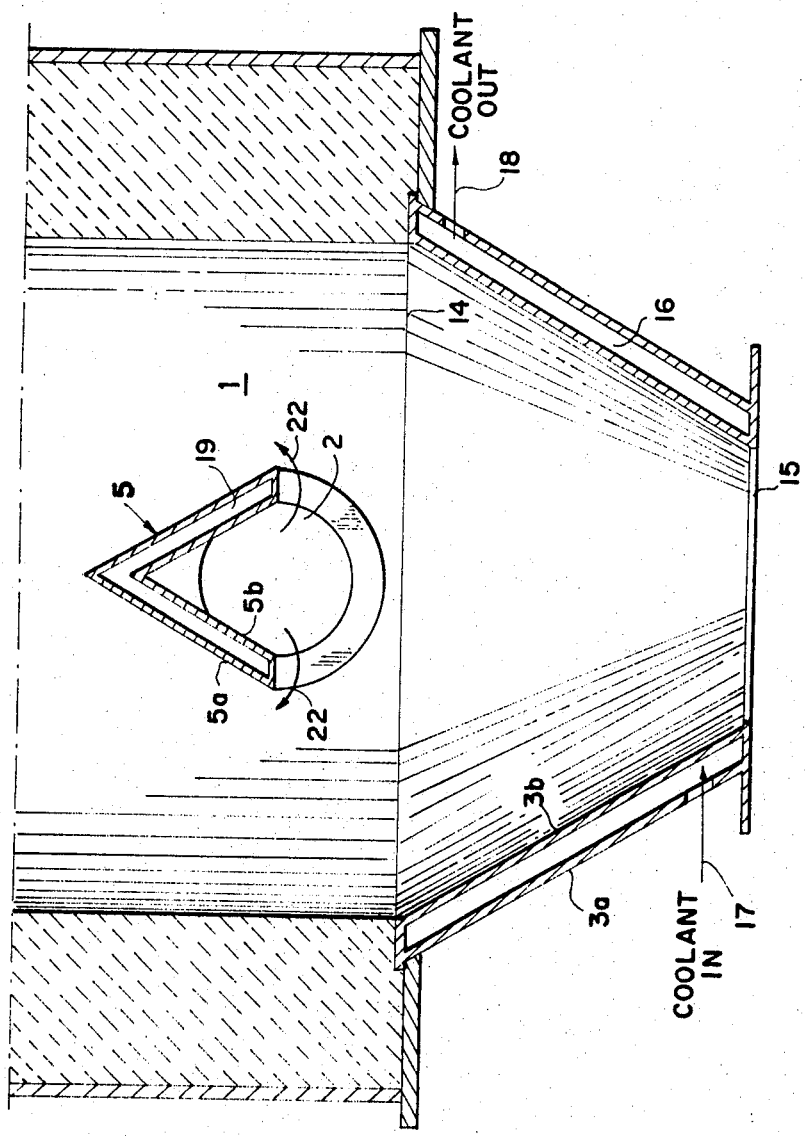

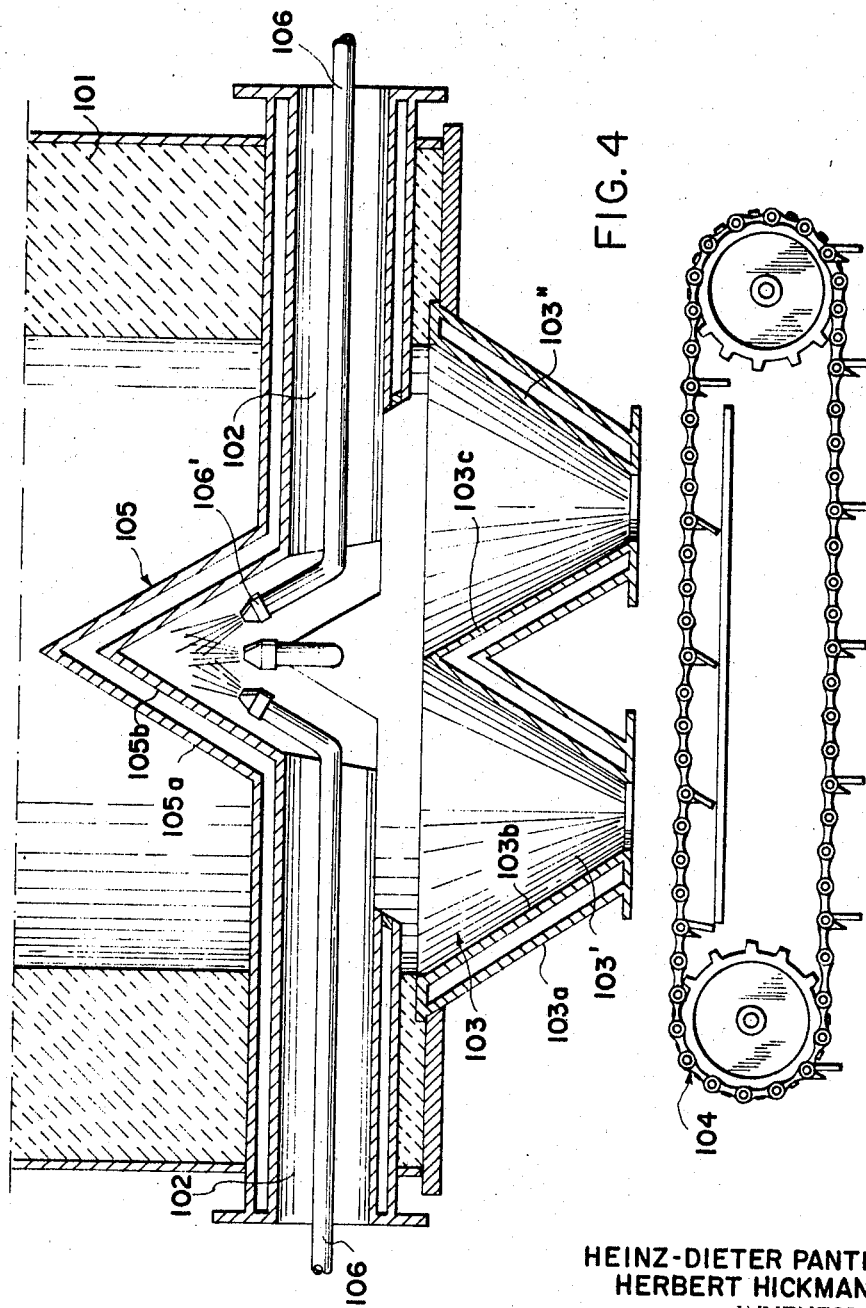

BY Karl F. Ross
Attorney

United States Patent Office 3,450,396
Patented June 17, 1969

3,450,396
FURNACE FOR DIRECT REDUCTION OF IRON ORES
Heinz-Dieter Pantke, Essen-Frintrop, and Herbert Hickmann, Oberhausen, Germany, assignors to Firma Huttenwerk Oberhausen AG, Oberhausen, Germany, a corporation of Germany
Filed July 26, 1966, Ser. No. 568,049
Claims priority, application Germany, July 29, 1965, H 56,713
Int. Cl. F27b *1/08, 21/00;* C21b *13/02*
U.S. Cl. 266—20                              9 Claims

ABSTRACT OF THE DISCLOSURE

A shaft furnace for the direct reduction of iron ore in which, directly above the outlet, a gas distributor of roof-shaped upwardly convergent configuration is centrally located and supplied with gas through an inlet pipe of similar configuration.

---

Our present invention relates to a shaft-type furnace for the direct reduction of iron ore, i.e. the reaction of an iron oxide with reducing gases, to produce sponge generally without significant smelting of the iron.

There have been proposed various systems for converting iron oxides into iron suitable for refining into steel. In the indirect reduction processes, a charge of iron ore, coke and a slag-forming substance is introduced into a blast furnace whereby air blown into the furnace from below converts the ore to molten iron. Within the blast furnace, impurities in the iron ore are either dissolved in the slag or carried off by conversion to gases while the carbon (of the coke) reacts with oxygen of the air to form carbon monoxide and with the oxygen of the ore to produce elemental iron. The carbon monoxide, moreover, reacts with additional quantities of iron oxide to convert it into elemental iron. At the bosh, a smelting zone close to the tuyères, the elemental iron is converted into iron droplets which accumulate at the foot of the furnace; the pig iron is tapped as a liquid stream therefrom at intervals.

In a direct-reduction process, the charge of iron ore is reacted with a reducing gas and converted into elemental iron in the form of a sponge without passing through the liquid phase. The shaft-type furnaces hitherto provided for this purpose bear a resemblance to the blast furnaces mentioned earlier for the production of pig iron especially as far as the stack at the upper part is concerned. There are, however, some significant differences between the two types of furnace. Thus, the direct type reduction power requires some means capable of discharging the solid sponge iron produced by the gaseous reduction of the iron ore whereas the blast furnace uses a liquid-collecting trough or sump which is tapped periodically. The means for introducing the respective gases also differs; in blast furnaces, for example, the blast air is introduced from a blast pipe running around the furnace and acting as a manifold for a multiplicity of tuyères or nozzles which inject the air substantially in a horizontal plane from the periphery of the furnace and transversely to the vertical axis thereof. In the direct-reduction furnace, however, it is desirable to introduce the reducing gases centrally with respect to the charge and in a generally vertical direction.

In shaft-type reducing furnaces for the direct reaction of iron ore with a reducing gas, it is the practice to remove the sponge iron from the base of the tower by means of a rotating central disk or a linearly shiftable ram whose motion is perpendicular to the axis of the tower and which ejects the solid material through a gap between the furnace shell and the base plate of the furnace chamber. Such an arrangement has a highly detrimental effect upon the discharge means which are exposed to considerable mechanical stress, extremely high temperatures and corrosive environments. Furthermore, the mechanisms used for displacing the mechanical discharge element must be dimensioned to sustain forces of the type encountered in discharging a large mass of material at the base of a stack, such mechanism is being subject to strain, jamming and breakage. A further disadvantage of the conventional discharge systems is that they require tremendous amounts of energy per unit quantity of the product obtained.

Another disadvantage of conventional shaft-type direct-reduction towers, especially for the treatment of iron ores, is that the distribution of the gases within and about the charge within the stack—unlike the distribution in blast furnaces whereby the pressure drop at the tuyères is a minimal and the blast air enters the charge uniformly from around its periphery—of conventional systems for distributing the reducing gases through the charge within a direct-reduction furnace, has been found unsatisfactory largely because it is influenced by the means used for withdrawing the sponge iron from the furnace. In this connection, it may be noted that the usual distribution systems provide for the upward flow of the reducing gases through the interior of the charge and are characterized by the poor uniformity of distribution as well as a large pressure drop at the region of the introduction of the gases into the furnace chamber.

It is, accordingly, an important object of the present invention to provide direct-reduction furnace for the treatment of iron ores and the like whereby the aforementioned disadvantages can be avoided and the reduction of iron ore to sponge iron can be carried out with a relatively high efficiency.

A further object of this invention is to provide a columnar or shaft-type furnace for the reduction of iron ores which affords excellent efficiency in the discharge of the iron sponge from the furnace.

These objects and others which will become apparent hereinafter are attained, in accordance with the principles of the present invention, by providing a shaft-type or columnar furnace for the direct-reduction conversion of iron oxide to elemental iron (via the reaction of a reducing gas with the iron oxide) in which the sponge-iron removal system comprises a downwardly convergent discharge funnel whose upper end corresponds in cross-sectional area to that of the lower end of the furnace and which thus converges from a mouth of a diameter equal to that of the furance to a somewhat constricted discharge opening provided with mechanism for mechanically dispensing the sponge iron. The discharge-funnel means can, according to the present invention, comprise a multiplicity of individual funnels aligned in a row or in some other convenient array with suitable partition means being disposed between the funnels of the arrays for preventing accumulation of the sponge iron thereon. It has been discovered that suitable partitions may be composed of grate-like or rod-like arrays of bars or other partition elements. The funnel or funnels serving to discharge the sponge iron should also be cooled with the aid of a cooling fluid and, for this purpose, it has been found to be advantageous to provide the walls of the funnels as so called double walls, i.e. with a clearance between inner and outer walls surfaces through which a cooling fluid can be circulated. The walls need not be cooled if they are composed of a refractory material such as a ceramic although it has been found desirable to cool the walls even in this case.

We have discovered that the provision of a downwardly converging well means bridging the outlet, spaced below the base of the upright column, and the base to form the funnel has a surprising effect in eliminating or reducing the thickness of the annular passive zone of charge which appears to form in shaft-type furnaces. In fact, we have observed that a silo-type device through which the descending solid mass passes has a tendency to produce a passive peripheral zone and an active central zone, the passive zone being essentially immobile while the central zone moves through the column. The volume rate of flow of the mass is thus reduced by the volume of the loose material packing into the passive zone. Investigations have shown also that the boundary layer of the mass between the flowing or active central portion and the surrounding passive zone is ellipsoidal and result in a nonuniform treatment of the moving material with the reducing gases. Surprisingly, the provision of a disk-type base for the silo-type column to distribute the mass peripherally during the discharge of the metallic iron does not completely overcome these disadvantages although it does reduce the thickness of the peripheral passive zone. Apparently the disk produces a new passive zone extending conically and centrally above the disk which also limits the efficiency of the operation and its uniformity.

While we do not wholly understand the mechanism whereby the disadvantages enumerated above are obviated by the present invention, it has been observed that the movement of the mass from the base of the column to an outlet therebelow, whose cross-sectional area is only a fraction of the cross-sectional area of the column at its base, effectively minimizes the thickness of the passive zone and sharply increases the reduction efficiency. More specifically, we have found it to be of considerable advantage if the outlet (or each outlet, when a row of them is provided along the conveyor means) has a diameter of approximately 400 mm., but chosen such that the larger particles of the metallic iron can be removed and access afforded to the interior for repairs.

According to a further feature of this invention, the conveyor means adjacent the outlet for conducting the metallic iron passing therethrough away from the funnel is constituted as a vibrating or reciprocating conveyor with at least a component of movement parallel to the axis of the column, i.e. in vertical direction. In this manner the iron sponge discharged from the funnel can be shaken up and loosened so that its further movement is effected without difficulty. It is also possible in accordance with the principles of the present invention to make use of a scraper-type conveyor, wherein, for example, a plurality of scraper bars carried by an endless chain conveys the material from the outlet. When the funnel is cooled, the sponge iron is usually deposited on the conveyor at a temperature substantially below the reducing temperature so that difficulties are not encountered with a thermal distribution of the conveyor. The gas distribution advantageously is carried out with the aid of a gas-distributing member disposed centrally of the column and open downwardly to direct the reducing gas generally outwardly.

In a preferred system using the principles of the present invention, the gas-distributing member is upwardly convergent (e.g. of ridge, cone or pyramid shape) and communicates with at least one but preferably two gas-supply ducts or pipes. The acute apex angle of the upwardly convergent member is chosen such that no material tends to remain thereon during the descent of the product through the base of the column. The outward deflection by the gas-distributing member and the inward deflection by the funnel appears to completely obliterate the passive zone normally formed in silo-type structures. Under these circumstances, the rate of throughput of the solid material is sharply increased by comparison with other shaped furnaces of similar diameter and height. Moreover the central gas-distributing member insures that the rising stream of gases will be uniformly distributed over the entire charge.

A particularly convenient arrangement is possible when a pair of gas ducts is provided and the ducts communicate with the interior of the gas-distributing member which diverts the gases laterally into the column; the gas-distributing member thus constitutes a member bridging the ducts. When the member is ridge-shaped, it can form an inverted downwardly open trough with which the ducts communicate and which passes diametrically through the column directly above the funnel. Fluid-cooling means are also provided for the gas-distributing member and the duct portion.

The above and other objects, features and advantages of the present invention will become more readily apparent from the following description, reference being made to the accompanying drawing in which:

FIG. 1 is a vertical cross-sectional view, in section along an axial plane, of a shaft-type furnace embodying the present invention;

FIG. 2 is a cross-sectional view taken along the line II—II of FIG. 1;

FIG. 3 is a cross-sectional view taken along the line III—III in FIG. 1;

FIG. 4 is a view generally similar to FIG. 2 but illustrating the base of another shaft furnace in accordance with this invention;

Figure 6:
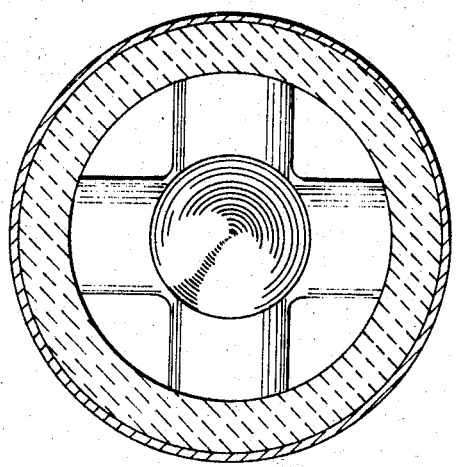
FIG. 6 is a cross-sectional view taken along line VI—VI of FIG. 1.

As seen in FIG. 1, a shaft furnace for the direct reduction of an iron ore by the reaction thereof with a reducing gas generally comprises a column 1 whose interior is surrounded by a refractory lining 10 which, in turn, is encased in steel shell 11. The chamber 1 of the column diverges slightly downwardly from the head 12 at which the column is provided with a gas-collecting hood 13 through which a continuous charge of iron ore can be introduced by skip loaders, bucket conveyors or the like. For convenience in describing the column, the foundation thereof has been removed although it can be seen that the base of the column is provided with a discharge funnel 3 whose mouth 14 has a cross-sectional area essentially equal to that of the column at the base of the tower; the discharge opening 15 at the base of the tower had a cross-sectional area which is only a fraction of that of the base of the column and the diameter of which may be about a third of that of the mouth 14. Best results are obtained when the diameter of outlet 15 is about 400 mm. As can be seen from FIGS. 1 and 2, the funnel 3 comprises a pair of downwardly diverging walls 3a and 3b which define between them a chamber 16 to which a cooling fluid (e.g., water or steam) can be supplied continuously as represented by arrows 17 and 18. Directly below the outlet 15, which is axially aligned with the column 1, we provide an oscillating-type conveyor 4 which loosens the sponge iron and gradually meters it out of the funnel 3. This conveyor may be of the type described at pages 7–13 and 7–14 of Perry's Chemical Engineers' Handbook, fourth edition, McGraw-Hill, New York, 1963 and comprises a trough 4a suspended from springs 4b and oscillated by a vibrating motor 4c. The sponge iron is dispensed to the right (FIG. 1) into a hopper or another conveyor for further treatment.

Directly above the funnel 3, there is provided a pair of inlet ducts 6 at diametrically opposite locations lodged in the wall 10, 11 of the furnace. Bridging the ducts 6 is a gas-distributing member 5 whose spaced-apart walls 5a and 5b define a passage 19 to which a coolant (e.g., water or steam) is supplied via the means represented at 20 and is led from the cooling passage at 21. The downwardly open wedge-shaped member 5 permits the gases entrained thereunder to pass laterally from the gas-inlet means generally designated at 2 upwardly into the charge as represented by the arrows 22.

In this case the downwardly open member 5 constitutes an inverted trough from which the gases rise outwardly although the trough itself may be pierced with apertures to further distribute the gases.

In the modification of FIG. 4, the conveyor 104 is of the scraper-type and can represent any of the conveyors illustrated on pages 7-15 to 7-17 of Perry's Chemical Engineers' Handbook (supra). The conveyor 104 underlies the plurality of spouts 103', 103", etc. of the funnel 103 whose double walls 103a and 103b define a water or steam cooling chamber as previously discussed. At the base of the column 101, the gas-distributing member 105 is disposed directly above the wedge-shaft partition 103c between the funnels 103' and 103" and is of conical configuration; the conical gas-distributing member is downwardly open so that the gases pass laterally outwardly into the charge. The walls 105a and 105b of the conical member 105 are spaced apart for the circulating coolant which also passes through the ducts 102. The gases can be introduced via radial pipes 106, whose nozzles 106' are directed upwardly into the hood formed by the distributor 105. The ends of duct 102 can be sealed or used to supply part of the reducing gases or a component from which the reducing gases may be formed within the hood by reaction with the fuel introduced via the nozzle 6.

Figure 5:
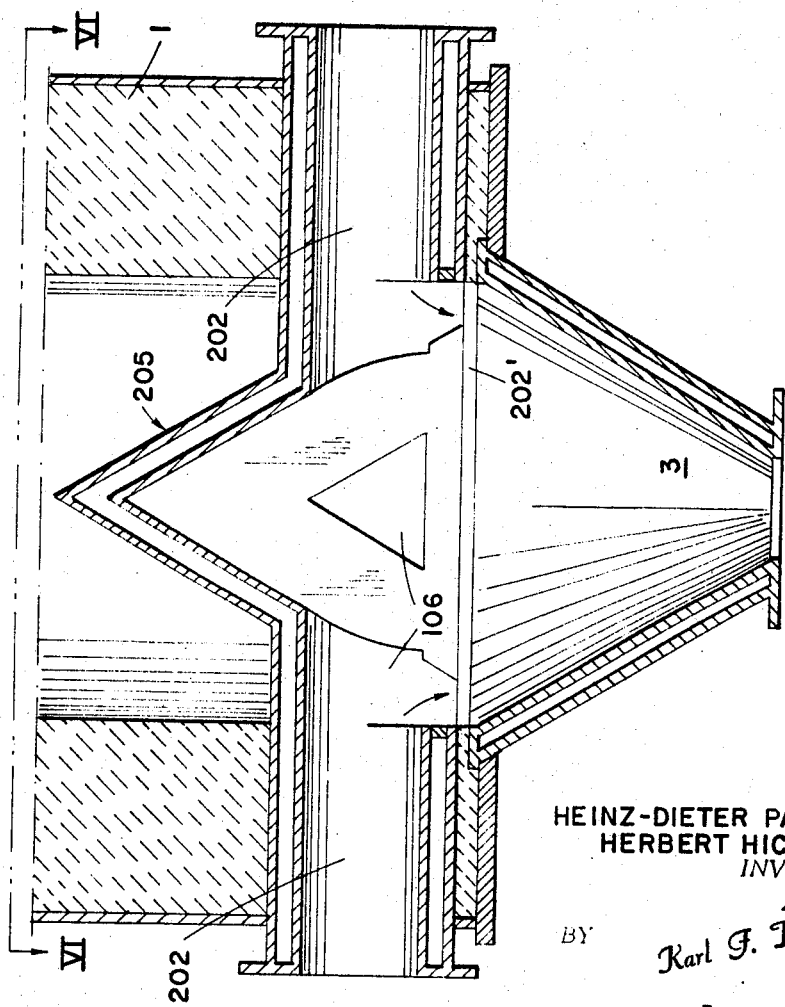
FIG. 5 is an axial cross-sectional view showing modification of the gas-type means.

In the modification of FIGS. 5 and 6, the conical hood 205 of the gas-distributive member communicates with the ducts 2 directly with these ducts being open downwardly at 202'. The gas passages are connected at 106. With all of these systems there is a marked increase in the diameter of the active zone and the throughput of reduced iron for a given furnace diameter.

The invention described and illustrated is believed to admit of many modifications within the ability of persons skilled in the art, all such modifications being considered within the spirit and scope of the appended claims.

We claim:
1. A shaft furnace for the direct reduction of iron ore, comprising an upright column for receiving a charge of iron ore at its upper end and reacting it with a rising stream of a reducing gas to convert the descending charge to metallic iron; gas-inlet means formed at the base of said column for introducing said stream of reducing gas to the interior thereof; discharge means provided with at least one outlet spaced below the base of said column and of a cross-sectional area less than that of the interior of said column at the base thereof for leading said metallic iron from said column, said discharge means including downwardly converging wall means bridging said outlet and said base of said column while forming a funnel for the metallic iron led from said column; and conveyor means adjacent said outlet for conducting the metallic iron passing therethrough away from said funnel, said gas-inlet means including a distributing member of generally roof shaped of upwardly convergent configuration and being located directly above said outlet centrally of said furnace, and a duct extending radially into said furnace for supplying gas to said member while being of similar configuration.

2. A shaft furnace for the direct reduction of iron ore, comprising an upright column for receiving a charge of iron ore at its upper end and reacting it with a rising stream of a reducing gas to convert the descending charge to metallic iron; gas-inlet means formed at the base of said column for introducing said stream of reducing gas to the interior thereof; discharge means provided with at least one outlet spaced below the base of said column and of a cross-sectional area less than that of the interior of said column at the base thereof for leading said metallic iron from said column, said discharge means including downwardly converging wall means bridging said outlet and said base of said column while forming a funnel for the metallic iron led from said column; and conveyor means adjacent said outlet for conducting the metallic iron passing therethrough away from said funnel, said gas-inlet means comprising a distributing member of upwardly convergent configuration centrally of the interior of said column at said base thereof, said member being open downwardly for distributing the gas outwardly thereof, a pair of gas-inlet ducts extending into said column at diametrically opposite locations for delivering gas to said member, said member being a bridge piece connecting said ducts and spanning said column at said base along a diameter thereof.

3. A shaft furnace as defined in claim 2 further comprising means for cooling said wall means, said cooling means including a chamber surrounding said wall means and formed by a pair of spaced apart walls thereof, and means for circulating a cooling fluid through said chamber.

4. A shaft furnace as defined in claim 2 wherein said member is generally wedge-shaped and forms an upwardly convergent ridge extending along said diameter of said column, said member further forming a downwardly open trough interconnecting said ducts and disposed directly above said funnel.

5. A shaft furnace as defined in claim 2 wherein said member is double-walled and forms a passage for a cooling fluid, further comprising cooling means for introducing said cooling fluid into said passage.

6. A shaft furnace as defined in claim 1 wherein said member is of generally conical configuration.

7. A shaft furnace as defined in claim 1 wherein said member is of generally pyramidal configuration.

8. A shaft furnace as defined in claim 2 wherein said conveyor means includes a reciprocating conveyor pan below said outlet, and means for oscillating said pan for loosening the metallic iron discharge from said funnel upon the passage thereof through said outlet.

9. A shaft furnace as defined in claim 2 wherein a plurality of outlet openings are provided and said openings are spaced apart along said conveyor.

References Cited

UNITED STATES PATENTS

| | | | |
|---|---|---|---|
| 2,624,560 | 1/1953 | Craig et al. | 266—25 X |
| 2,697,598 | 12/1954 | Affleck | 266—32 |
| 3,063,695 | 11/1962 | De Vaney | 266—29 X |

FOREIGN PATENTS 146,406   5/1952   Australia.

J. SPENCER OVERHOLSER, *Primary Examiner.*
J. S. BROWN, *Assistant Examiner.*

U.S. Cl. X.R.
266—25